Oct. 2, 1956 W. M. WOODARD 2,764,806
ROLL NECK BEARING EXTRACTING INDUSTRIAL TRUCK
Filed Dec. 26, 1952 2 Sheets-Sheet 1
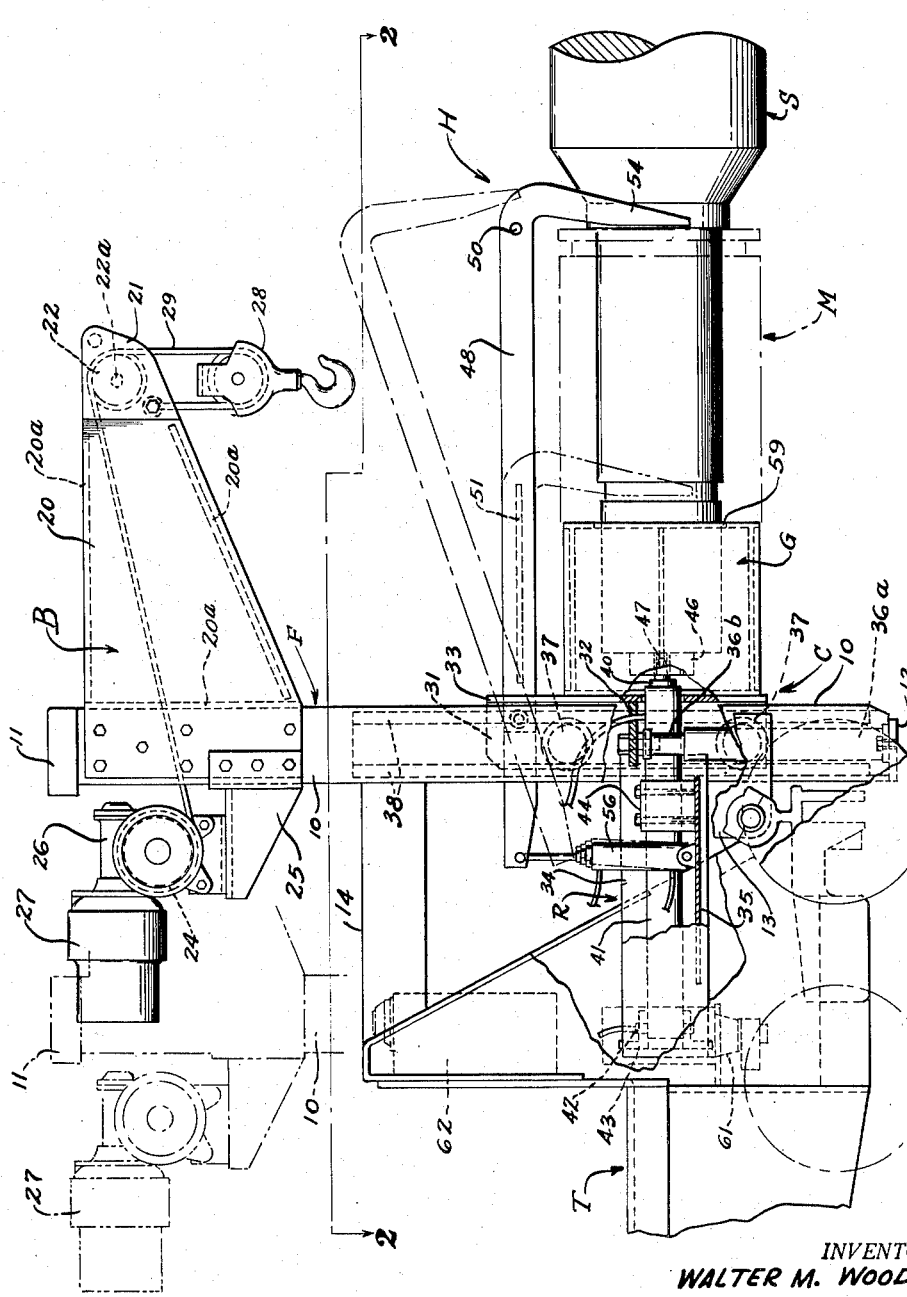
INVENTOR.
WALTER M. WOODARD
BY
Albert R. Golrick
ATTORNEY

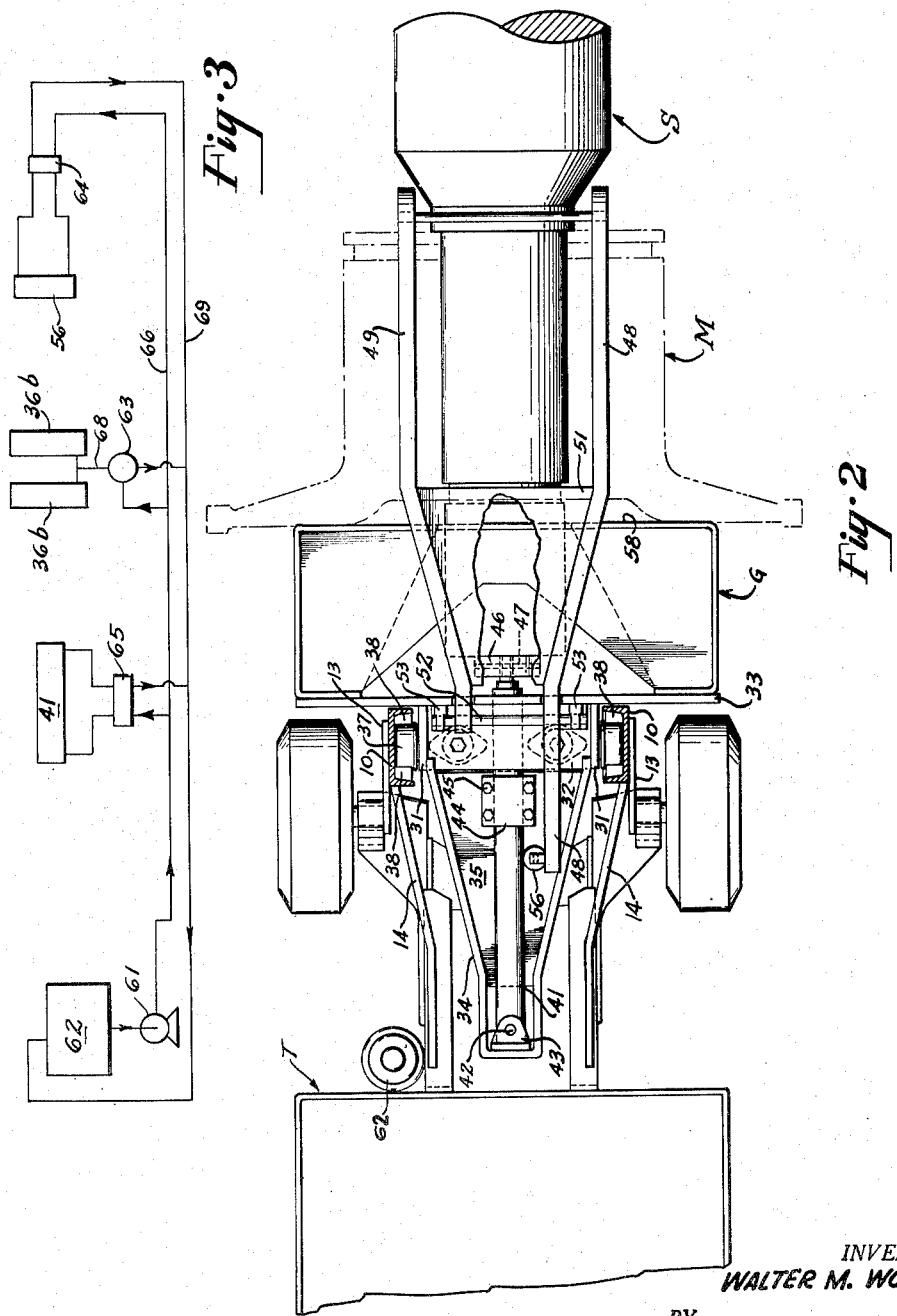

United States Patent Office 2,764,806
Patented Oct. 2, 1956

2,764,806

ROLL NECK BEARING EXTRACTING INDUSTRIAL TRUCK

Walter M. Woodard, Grafton, Ohio, assignor to Elwell-Parker Electric Company, Cleveland, Ohio, a corporation of Ohio Application December 26, 1952, Serial No. 327,949

4 Claims. (Cl. 29—252)

The present invention relates to industrial trucks and more particularly to a truck adapted to the removal and handling of press-fitted heavy bearings from shafts and like operations.

The maintenance of many machines in heavy industrial plants involves the removal of press-fitted parts from one another, parts of such size and weight that operations carried on by sheer manpower are cumbersome, time consuming, inefficient and often dangerous to the workmen and machine elements involved. For example, the maintenance of rolling equipment in steel mills at times requires the removal of press-fitted roll neck bearings from the rolls, either for repair and replacement of the bearings or to facilitate manipulation of the rolls during operations for restoring the roll surface to proper condition. Due to the massive size of the rolls and their neck bearings, the removal of the bearings by manpower entails the several aforementioned disadvantages. The present invention is directed to the provision of an industrial truck constituting, in effect a mobile self-powered tool adapted to the extraction of such bearings from the necks of rolls, and further, to the safe, expeditious handling of the bearings in the operations during and subsequent to removal. Although the invention will be described herein with reference to rolls or shafts and bearings press-fitted thereon, it is to be understood that the invention may be applied in operations on other press-fitted elements of analogous geometry.

An object of the present invention is the provision of a shaft bearing extracting mechanism on an industrial type truck whereby the mechanism may be transported to the location of a shaft. Another object of the invention is the provision of an extracting mechanism mounted to a truck in such manner that the mechanism may be readily brought to correct operating position relative to a horizontal shaft and its bearing without necessity of moving the shaft. A further object is the provision in an industrial truck of a bearing extracting mechanism including means for supporting the bearing during and after removal from its shaft to prevent damage thereto and for transportation of the extracted bearing.

Other objects and advantages of the invention will appear from the following description and the drawings wherein:

Fig. 1 is a side elevational view showing the pertinent part of an industrial truck of this invention, adapted to operations on a shaft disposed horizontally, that is parallel to the truck supporting surface;

Fig. 2 is a plan view partially in section taken along the line 2—2 of Fig. 1; and Fig. 3 shows diagrammatically one manner of connecting hydraulic elements in the described form of the invention for controlling supply of hydraulic fluid selectively thereto.

In the drawings there is shown the end portion of an industrial type truck T having at the end of the chassis a vertical rectangular frame F provided at its upper portion with a crane or boom mechanism B and on the lower portion with an elevator assembly including a vertically movable elevator carriage C carrying a pivotally mounted bearing engaging hook H and a horizontal ram mechanism R. The truck is shown as initially positioned for the removal of a roll neck or shaft bearing M from a roll or shaft S, which two elements are represented for clarity by dashed and solid lines respectively.

The frame F, formed of two vertical channel members 10 with inwardly disposed channel flanges and top and bottom end plates 11, 12, is attached to the chassis by rearwardly extending plates 13 affixed to the outside of the lower ends of the channel members 10 and by strut plates 14 extending from points intermediate the ends of the channel members 10 rearwardly to the upper portion of the truck chassis.

The boom structure B, which serves to support the bearing M as it is removed from shaft S, is formed of a boom arm comprising two side plates 20 secured to the external lateral surfaces of the members 10 and converging outwardly to parallel end portions 21 between which a sheave 22 is mounted on shaft 22a; and a hoist assembly including a cable winding drum 24 supported at the rear side of the frame F by bracket structure 25 and driven through speed reducer unit 26 by a motor 27 for raising and lowering the hook block 28 on cable 29. Plates 20a extending between the side plates 20 may be used to reenforce the boom arm. The controls for the hoist motor are not shown, since the motor may be of any suitable type adapted to the energy supply of the truck; for example, an electric or hydraulic motor.

In the carriage C, which is preferably a welded plate structure, side members 31 disposed within the frame adjacent to the channel members 10 and joined by a central spacing and reenforcing plate 32 are spanned at forward edges by transverse vertical plate 33 extending laterally beyond frame F. A roughly V-shaped yoke member 34, extending rearwardly into the space behind frame F with each side leg thereof secured to one of the side members 31 and including a horizontal bed plate 35 secured within the legs, provides a base for ram mechanism R mounted centrally on the carriage as hereinafter explained. On the outer face of each side member 31, a vertically spaced pair of flanged wheels 37, engaged between the track members 38 affixed within the channel flanges of members 10, support and guide the carriage for vertical movement in frame F. The carriage is elevated by the extension of hydraulic piston and cylinder assemblies disposed within the frame 10 at each side of the ram mechanism, the cylinders 36a and pistons 36b thereof bearing on and being secured to the frame bottom plate 12 and the spacing plate 32 of the carriage respectively. The piston cylinder assemblies may be of the single acting type since the weight of the carriage and attached mechanisms will cause descent of the carriage when the hydraulic pressure used for elevation is released.

The bearing extractor ram mechanism R includes a horizontal double acting piston-cylinder unit 40, 41 (shown in contracted condition) disposed centrally on the carriage to act longitudinally of the truck, with the working end of the cylinder 41 extending forwardly through and beyond the apertured transverse plate 33 of the carriage. Axially aligned, vertically disposed pivot lugs 42 projecting from the end of cylinder 41 through apertures in brackets 43 mounted within the apex portion of member 34, and a clamping block 44 held by clamp bolts 45 engaging the bed plate 35 at either side of the cylinder 41 secure the cylinder in position on the carriage. This cylinder mounting arrangement allows adjustment of the position of the axis of the cylinder-piston assembly as required during installation in the carriage. One of the pivot lugs 42 may be axially bored to provide an inlet for hydraulic fluid at one end of the cylinder 41 for extending the ram mechanism, while a second inlet through nipple 42a is provided at the other end for retracting the mechanism. A pressure block 46 carried on the end of piston 40 and secured by pin 47 provides a large contact surface for the application of the force of the ram assembly against the end of the shaft from which the shaft bearing is to be removed. The extreme face dimension of the block used must, of course, be smaller than the shaft end diameter.

The bearing engaging hook H, comprising a pair of hook bars 48, 49 rigidly maintained in laterally spaced relation at the outer ends by a rod 50 and toward the inner ends by a plate member 51, is pivotally mounted at its inner end on the rear face of the vertical plate 33 of the carriage by transverse rod 52 journalled in the pivot blocks 53. For ease of assembly and removal of the hook H the pivot blocks may be of the split type with the parting plane thereof vertically and transversely disposed. The bars 48, 49 are disposed equidistantly from the vertical plane through the axis of the piston cylinder assembly of the ram mechanism. To lower and raise the hook H in swinging the depending end portions 54 thereof into and out of position behind the inner end of shaft bearing M, a vertically disposed double acting hydraulic unit 56 is provided with the cylinder and piston thereof pivotally secured respectively to the bed plate 35 and the rearward extension of bar 48. The plate 33 of the carriage is accordingly slotted or apertured as required for the movement of the hook bars. Preferably the sheave 22, from which the block 28 depends, is located centrally over the bearing receiving space between the bearing gauging surface 59 and hook ends 54, so that with suitable lashing secured to block 28 the bearing may be supported by the boom during and after removal against movement which might tend to damage either shaft or bearing.

A gauge or guide structure G, including a vertical transverse gauging surface 58 having an opening 59 for the receipt of the end of shaft S in alignment with the ram mechanism R, is mounted on the plate 33 of the carriage. By moving the truck into operating position with the gauging surface 58 squarely against the end of the bearing M and with the end of the shaft disposed within the opening 59, substantial alignment of the ram mechanism R with the shaft S and parallel disposition of the bearing end engaging surfaces on the hooked ends 54 relative to the inner end of bearing M are attained. Preferably, the guide structure G is removable from plate 33 for replacement by another guide structure of different dimensions, so that the distance between the guide surface 58 and the ends of the hook H may be varied to accommodate bearings M of different lengths.

On the truck chassis, lateral to the path of travel of the ram mechanism, a motor and hydraulic pump unit 61 and a hydraulic fluid reservoir 62 therefor are mounted to provide the hydraulic pressure necessary for the operation of the several aforementioned hydraulic piston and cylinder assemblies. For sake of clarity in Figs. 1 and 2, the hydraulic lines and fluid control units selectively connecting the pump, reservoir, and the various hydraulic actuating units are omitted. However, it is to be understood that suitable hydraulic lines and control means are to be used whereby fluid pressure may be applied as desired to the individual actuating units. Thus in Fig. 3 there is shown in schematic form one form of hydraulic circuit suited for the operation and control of the hereinbefore described hydraulic units. The inlet side of pump 61 is connected to reservoir 62 to draw hydraulic fluid therefrom and the outlet side of the pump supplies fluid through line 66 to valve 63, controlling the carriage elevating cylinders 36b, to valve 64 controlling the bearing extracting hook cylinder 56, and to valve 65 controlling the ram mechanism. The valve 63 is adapted at one position to direct fluid through line 68 into the single acting cylinders 36b raising the carriage, at another position to block flow from the cylinders, and at a carriage lowering position to vent the carriage lift cylinders through exhaust line 69 back to the reservoir to allow the carriage to descend. Valves 64 and 65 are each fluid reversing valves which at one position connect the pressure line 66 to one end of the cylinder controlled thereby for admission of hydraulic fluid while connecting the other side of the cylinder to the exhaust line 69 conducting fluid back to the fluid reservoir. At another position these valves 64, 65 in effect reverse the connections of the fluid pressure line and fluid exhaust line relative to the cylinders, while at a neutral position each valve blocks any flow relative to the corresponding cylinder. In accordance with general practice, means for controlling the pressure to individual cylinders, or for relieving pressure in line 66 to the reservoir when a certain pressure maximum is exceeded, may be provided. Where mechanical or other means are used for raising or lowering the carriage or the bearing engaging hook, the control system would of course be varied accordingly.

In operation, the elevator carriage is raised to the position required to align the ram mechanism substantially with the shaft S from which the bearing M is to be removed. The hook H is then raised to the position indicated by the dashed hook outline in Fig. 1 and the truck is directed into proper position by bringing the guide surface 58 flat against the outer end of the bearing, thereby bringing the shaft S into position in close alignment axially with the ram mechanism. The hook H is then dropped into position to bring the end 54 thereof into position behind the inner end of the bearing M. A suitable chain or sling is then put about the bearing and drawn up by means of the block 28 of the boom mechanism. As the ram mechanism is extended the piston 40 moves outwardly to bring the contact block 46 against the end of the shaft. With the block 46 pivoting to some degree about the horizontal axis of pin 47, the block is self-adjusting to compensate for minor angular misalignments of ram and shaft axes in a vertical direction, which may arise from slope or unevenness of the truck supporting surface, from a non-horizontal disposition of the shaft axis or other causes. A ball and socket mounting for the block 46 may be used to allow like compensations in a horizontal as well as vertical direction.

Since the bearing engaging ends 54 of hook H are fixed insofar as axial movement relative to the ram cylinder 41 is concerned and therefore the bearing engaged thereby is similarly fixed, continued extension of the piston 40 bearing on the end of shaft S effects a movement of the shaft out of the bearing. If the shaft either by virtue of its weight or mounting is in fixed position, the truck with attached hook H is moved backwardly away from the shaft (as indicated by the dashed lines in the upper part of Fig. 1) thereby drawing the bearing M from position on the shaft. When the bearing is displaced from the shaft, the ram piston is retracted. The boom mechanism hooked to the lashing or sling about the bearing supports the bearing at all times, thereby preventing any damage to the ram piston extended into the bearing or to the end surfaces of the shaft or bearing by canting or dropping of the bearing as it leaves engagement with the shaft. The freed bearing suspended from the boom then may be transported by the truck for deposit wherever desired.

It is to be understood that by the use of suitable wheel blocking or truck braking mechanism, and the use of a pressure block 46 of size sufficient for contact of the end of the bearing, the truck herein described may be utilized in the replacement of bearings on shafts, provided the force required is such that the truck may be maintained stationary, or the hook may engage the shaft. In such operation the bearing is suspended from the boom mechanism with axis horizontal, and the truck is brought into position adjacent the shaft to which the bearing is to be applied. The elevator is adjusted to bring the ram mechanism into substantial alignment with the shaft, and the bearing is moved by the hoist into precise axial alignment with the shaft. With the truck braked or blocked, or, where possible, with the shaft engaged by hook H, the ram mechanism is extended in contact with the bearing to force it onto the end of the shaft.

I claims:

1. An industrial truck for releasing from each other a press fitted roll neck bearing and roll shaft comprising a self-moving vehicle chassis, a vertical elevator frame rigidly mounted on one end of the chassis, the front and back of said elevator frame being open in construction, an elevator carriage mounted in said frame for vertical movement, said carriage having fixed forwardly and rearwardly extending elements with respect to said open vertical frame, a hydraulic ram mounted upon a rearwardly extending platform element fixed to the carriage, said ram being disposed to have an operating end thereof extend beyond the front of the vertical frame structure, a gauge structure on the forward part of the carriage, said gauge structure having an opening aligned with the ram for receiving the end of a roll shaft with a roll neck bearing therein a bearing engaging hook structure pivotally mounted on the carriage structure extending from the rear of the vertical frame forwardly of the frame to engage the remote end of a roll neck bearing when the shaft carrying the bearing is disposed in the said opening of the gauge structure.

2. An industrial truck for releasing from each other a press fitted roll neck bearing and roll shaft comprising a self-moving vehicle chassis, a vertical elevator frame mounted on one end of the chassis, the front and back of said elevator frame being open in construction, an elevator carriage mounted in said frame for vertical movement, said carriage having fixed forwardly and rearwardly extending elements with respect to said open vertical frame, a hydraulic ram mounted upon the rearwardly extending elements of the carriage disposed to have an operating end thereof extend beyond the front of the frame and carriage structure, a gauge structure on the forward part of the carriage, said gauge structure having an opening aligned with the ram for receiving the end of a roll shaft with a roll neck bearing thereon and a bearing engaging hook structure pivotally mounted on the carriage structure extending forwardly from the carriage to engage the remote end of a roll neck bearing when the shaft carrying the bearing is disposed in the said opening of the gauge structure.

3. An industrial truck for releasing from each other a press fitted roll neck bearing and roll shaft comprising a self-moving vehicle chassis, a vertical elevator frame rigidly mounted on one end of the chassis, the central region of said elevator frame being open in construction, an elevator carriage mounted in said frame for vertical movement, said carriage having fixed forwardly and rearwardly extending elements with respect to said open vertical frame, a hydraulic ram mounted upon the rearwardly extending elements of the carriage disposed on the carriage to be moved vertically in said frame opening, said ram having an operating end thereof extending beyond the front of the frame and carriage structure, said rearwardly extending elements including a pivotal mounting for the rear end of the ram, a gauge structure on the forward part of the carriage, said gauge structure comprising a vertical wall having an opening aligned with the ram for receiving the end of a roll shaft with a roll neck bearing thereon and a bearing engaging means pivotally mounted on the carriage structure and extending forwardly to engage the remote end of a roll neck bearing when the shaft carrying the bearing is disposed in the said vertical wall opening.

4. An industrial truck for releasing from each other a press fitted roll neck bearing and roll shaft comprising a self-moving vehicle chassis, an open vertical elevator frame rigidly mounted on one end of the chassis comprising face to face channel tracks for the rollers of a carriage, an elevator carriage with rollers mounted in said frame channel members for vertical movement, said carriage having fixed rearwardly extending elements vertically carried by the carriage in said frame opening, a hydraulic ram mounted upon the rearwardly extending elements of the carriage disposed to have an operating end thereof extend beyond the front of the frame and carriage structure, a gauge structure fixed on the forward part of the carriage, said gauge structure having an opening aligned with the ram for receiving the end of a roll shaft with a roll neck bearing thereon, a bearing engaging hook structure pivotally mounted on the carriage structure extending forwardly to engage the remote end of a roll neck bearing when the shaft carrying the bearing is disposed in the said gauge opening and hydraulic ram means supported on a rearwardly extending element fixed to the carriage for operating said hook structure.

References Cited in the file of this patent

UNITED STATES PATENTS

| | | |
|---|---|---|
| 1,045,146 | Hunter | Nov. 26, 1912 |
| 1,760,989 | Lewis | June 3, 1930 |
| 2,488,180 | Evans | Nov. 15, 1949 |
| 2,622,315 | Loveland | Dec. 23, 1952 |

FOREIGN PATENTS

| | | |
|---|---|---|
| 587,179 | France | Apr. 14, 1925 |